United States Patent [19]

Sauer et al.

[11] Patent Number: 4,764,308

[45] Date of Patent: Aug. 16, 1988

[54] PROCESS FOR THE PRODUCTION OF PHOSGENE WITH SIMULTANEOUS GENERATION OF STEAM

[75] Inventors: Heinz Sauer, Odenthal, Fed. Rep. of Germany; Helmut F. Porkert, Baytown, Tex.; Dietrich Liebsch, Leverkusen, Fed. Rep. of Germany

[73] Assignee: Bayer Aktiengesellschaft, Leverkusen, Fed. Rep. of Germany

[21] Appl. No.: 103,561

[22] Filed: Sep. 30, 1987

Related U.S. Application Data

[63] Continuation of Ser. No. 630,548, Jul. 13, 1984.

[30] Foreign Application Priority Data

Jul. 28, 1983 [DE] Fed. Rep. of Germany ....... 3327274

[51] Int. Cl.$^4$ ............................................. C07C 51/58
[52] U.S. Cl. ................................................. 260/544 K
[58] Field of Search .................................... 260/544 K

[56] References Cited

U.S. PATENT DOCUMENTS

| | | | |
|---|---|---|---|
| 1,457,493 | 6/1923 | Bradner | 260/544 K |
| 3,364,272 | 1/1968 | Ager | 260/544 K |
| 4,073,806 | 2/1978 | Doubovetzky et al. | 260/544 K |
| 4,133,831 | 1/1979 | Masaki | 260/544 K |
| 4,231,959 | 11/1980 | Obrecht | 260/544 K |

FOREIGN PATENT DOCUMENTS

| | | | |
|---|---|---|---|
| 124490 | 6/1947 | Australia | 260/544 K |
| 553599 | 2/1958 | Canada | 260/544 K |
| 2600387 | 7/1976 | Fed. Rep. of Germany | 260/544 K |
| 2811310 | 9/1978 | Fed. Rep. of Germany | 260/544 K |
| 2109186 | 5/1972 | France | |
| 2297190 | 9/1976 | France | 260/544 K |
| 583477 | 12/1946 | United Kingdom | 260/544 K |

*Primary Examiner*—Paul J. Killos
*Attorney, Agent, or Firm*—Gene Harsh; Joseph C. Gil; Lyndanne M. Whalen

[57] ABSTRACT

Phosgene is produced by reacting chlorine and an excess of carbon monoxide in the presence of activated charcoal in a two stage process. In the first stage, the chlorine and carbon monoxide are reacted in a tubular reactor containing activated charcoal at a temperature above 250° C. unitl 95 to 98% chlorine has reacted. The reaction gases are cooled to a temperature of from 50° to 120° C. and then introduced into a second reactor maintained at 50 to 100° C. where the phosgene-forming reaction is completed. The phosgene leaving the second reactor has a residual chlorine content of less than 50 ppm. The heat generated during phosgene formation is used to produce steam.

8 Claims, No Drawings

PROCESS FOR THE PRODUCTION OF PHOSGENE WITH SIMULTANEOUS GENERATION OF STEAM

This application is a continuation, of application Ser. No. 630,548 filed July 13, 1984.

BACKGROUND OF THE INVENTION

This invention relates to a process for the preparation of phosgene by reacting chlorine with carbon monoxide in the presence of activated charcoal with concomitant generation of steam.

Phosgene is generally produced on a technical scale by reacting chlorine with carbon monoxide in the presence of activated charcoal at a slightly elevated temperature (40°-100° C.). Since the presence of large quantities of chlorine would interfere with most uses of the phosgene, the chlorine content is kept as low as possible. In order to ensure a low chlorine content of the product phosgene, the carbon monoxide is used in an excess of 3-10% over the stoichiometrically required quantity. In addition, the considerable positive enthalpy of formation (108 kJ/mol) is removed by vigorous cooling because the phosgene synthesis does not proceed to completion at temperatures above 100° C. (See e.g. Ullmanns Encyklopädie der technischen Chemie, 4th Edition, (1979), 18, pages 277-278).

On the basis of dissociation equilibria, phosgene contains about 50 ppm of chlorine at 100° C. For many applications such a chlorine content constitutes the upper permissible limit. At 200° C., as much as 0.4%, at 300° C. 5% and at 400° C. 20% of the phosgene is dissociated into carbon monoxide and chlorine. Consequently, all known processes are carried out in tubular reactors filled with activated charcoal from which reactors the heat of reaction may be rapidly removed by direct cooling with water, indirect cooling with inert cooling agents or evaporation cooling so that the temperature of the reaction gases leaving the reactor does not significantly exceed 100° C. Careful cooling of the reaction tubes is also very important for reasons of operational safety since ordinary structural steel used for the reactors reacts vigorously at temperatures above 170° C. to form iron chloride.

Under the usual operating conditions, virtually any good quality activated charcoal with a high absorption capacity is suitable for use as catalyst. The cooling medium temperatures after passage through the reactor are substantially below 100° C. (generally at 50°-70° C.). Consequently, $1.09 \times 10^9$ Joule per ton of phosgene cannot be used satisfactorily.

EP-A1-00 03 530 broadly discloses that the reactor used for the production of phosgene from chlorine and carbon monoxide may be cooled with boiling water to produce steam. No details are given. However, the production of high pressure steam is obviously not possible by this disclosed process because it is explicitly stated that the reaction product must be vigorously cooled immediately after the formation of phosgene (i.e. while still inside the phosgene reactor) to ensure that cleavage of the phosgene formed will not occur to any significant extent. This means that the temperature of the cooling medium cannot be substantially higher than 100° C., and the production of high pressure steam is therefore not possible.

SUMMARY OF THE INVENTION

It is an object of the present invention to provide a process for the production of phosgene in which the heat of reaction generated is used to generate steam.

It is also an object of the present invention to provide a process for the production of phosgene and high pressure steam.

It is another object of the present invention to provide a process for the production of phosgene having a residual chlorine content of less than 50 ppm (volume).

These and other objects which will be apparent to those skilled in the art are accomplished by reacting chlorine and excess carbon monoxide in a first tubular reactor containing activated charcoal at a temperature above 250° C. The heat generated during the reaction is removed from the reactor by means of a liquid or gaseous carrier which carrier is cooled which cooling is accompanied by the generation of steam. The reaction gases from the first tubular reactor are cooled to a temperature of from 50° to 120° C. and then transferred to a second reactor. This second reactor which generally contains granular activated charcoal is maintained at a temperature of from 50° to 100° C. The reaction is completed in this second reactor. The phosgene leaving this second reactor has a residual chlorine content of less than 50 ppm (volume).

BRIEF DESCRIPTION OF THE DRAWING

The drawing is a schematic representation of apparatus suitable for carrying out the process of the present invention.

DETAILED DESCRIPTION OF THE INVENTION

The present invention relates to a process for the production of phosgene by the reaction of chlorine with carbon monoxide in reactor tubes containing activated charcoal as catalyst with simultaneous utilization of the resulting heat of reaction for the generation of steam, in particular high pressure (i.e. 5-50, preferably 20-35 bar) steam.

In a first reactor tube 4 having an internal diameter of not more than 100 mm and containing granular activated charcoal, from 95-98% of the chlorine put into the process is reacted with excess carbon monoxide at a reaction temperature above 250° C. to produce phosgene. The heat of reaction generated is removed from reactor 4 by evaporation cooling of a liquid boiling at 150°-320° C. or by means of a non-boiling liquid the temperature of which is maintained at 150°-320° C. at the exit from the reactor by means of forced circulation pumps and temperature control. This liquid or gaseous heat carrier leaving the reactor is condensed in a heat exchanger charged with water as cooling medium to generate steam and/or is cooled to a temperature below that of the heat carrier at the exit from the reactor and returned to the reactor 4. The reaction gases leaving the reactor 4 are cooled to a temperature of from 50° C. to 120° C. and conducted into a second reactor 6 containing granular active charcoal. The temperature of this second reactor is maintained at 50° C. to 100° C. by thermostatic control. The reaction is completed in this second reactor and the phosgene leaving this reactor has a residual chlorine content of less than 50 ppm (volume).

The installation shown in the drawing is one example of apparatus suitable for carrying out the process of the present invention. In this drawing, the various reference numerals have the following meaning:

(1) Feed point for carbon monoxide,
(2) Feed point for chlorine,
(3) A gas mixing chamber,
(4) A first tubular reactor in the form of a nest of heat exchanger tubes,
(5) A cooler,
(6) A second tubular reactor in the form of a nest of heat exchanger tubes with circulation of cooling or heating medium,
(7) Phosgene discharge point,
(8) A heat carrier circulation line,
(9) A liquid separator,
(10) A heat exchanger (steam generator),
(11) The steam discharge point,
(12) The water feed point,
(13) A water pump,
(14) A heat exchanger,
(15) A cooling medium circulation line and
(16) A cooling medium pump.

The process of the present invention is preferably carried out using the apparatus illustrated schematically in the drawing but may, of course, also be carried out in apparatus which deviate in minor features from the one which has been illustrated. Thus, for example, instead of the combination reactor shown in the drawing, separate reactors arranged one behind the other may be used and the second reactor may take the form of a filling of active charcoal of sufficient height instead of the tubular reactor shown. Furthermore, it is, of course, not essential to the invention to utilize the heat obtained from cooling the gases leaving the first reactor for preheating the water fed into heat exchanger 10.

The first reactor 4 is preferably made up of a tube bundle heat exchanger each tube of which having an internal diameter of at most 100 mm, preferably not more than 50 mm and most preferably not more than 30 mm. The length of the tubes is not critical and is generally from 1 to 5 m. Fairly long reaction tubes are preferred because the position of the main reaction zone shifts as the catalyst becomes inactivated by dust and other impurities in the starting materials. The long tubes enable the reaction to continue for a longer time without change of catalyst. The reaction tubes are preferably made of a metal which is resistant to chlorine at the reaction temperature. These tubes are preferably manufactured from nickel or high alloyed chromium/nickel steel or chromium/nickel/molybdenum steel.

The tubes of the first reactor 4 are filled with activated charcoal having a grain size of about 3 to 10, preferably 3.5 to 7 mm. The activated charcoal used is preferably of the type having a compression resistance of more than 18 kilopond (kp) as determined in German Auslegeschrift 2 322 706, column 6, lines 28-38 and a benzene absorption capacity above 40 wt %. Fracture and abrasion resistant activated charcoals with high temperature resistance (described, for example, in German Auslegeschrift No. 2,322,706) which conform to these conditions are very suitable for the process of the present invention.

The second reactor 6 may be a phosgene reactor of conventional construction which is thermostatically controlled by means of a heat exchanger, preferably at temperatures from 50° C. to 100° C., most preferably from 70° to 100° C. However, a filling of activated charcoal of sufficient height may be used as the second reactor instead of a tubular reactor of conventional construction. The type of active charcoal used in the second reactor 6 is, of course, much less critical than that used in the first reactor 4. In principle, any type of activated charcoal known to be useful for the synthesis of phosgene may be employed in reactor 6. The second reactor 6 may, of course, also be filled with the same activated charcoal used in reactor 4.

The first reactor 4 is preferably cooled by evaporation cooling. The heat carrier employed may either be circulated without pressure and freely ventilated in an after-cooler (not shown) or adjusted to a suitable preliminary pressure (e.g., up to 10 bar) by pressure resistance means. In this manner, the boiling point of the heat carrier and hence the cooling temperature of the reactor may be varied. Examples of suitable heat carriers include decahydronaphthalene (e.g., the material sold under the trademark Decalin), diphenyl methane, aromatic chlorine compounds such as o-dichlorobenzene and appropriate mineral oil fractions. It would also be possible, in principle, to carry out the transfer of heat under pressure conditions such that the heat carrier does not evaporate. Liquids which do not boil at normal pressure at the temperature at which the heat carrier leaves the first reactor could also be used as heat carriers. In this less preferred method, the temperature of the heat carrier at the exit from the reactor is adjusted by forced circulation pumps and temperature control. The outlet temperature of the heat carrier leaving the first reactor in a liquid and preferably gaseous form is in the region of 150° to 320° C., preferably 200° to 300° C.

The cooler 5 is a conventional heat exchanger, e.g. a finned cooler preferably cooled with water. The heat removed from the reactor by way of cooler 5 may be used in heat exchanger 14 for preheating the feed water of heat exchanger 10, as shown in the drawing. The heat from heat exchanger 5 could also conceivably be used for preheating the carbon monoxide and/or chlorine.

Heat exchanger 10 is also of conventional construction, for example a tube bundle heat exchanger.

The carbon monoxide and chlorine used as starting materials for the process of the present invention must be dry and available in a sufficient degree of purity to prevent any unwanted side reactions or premature inactivation of the catalyst. The commercial carbon monoxide used generally has a CO content of at least 97 volume % while the commercial chlorine used generally has a $Cl_2$ content of at least 97 volume %. Lower concentrations would theoretically be possible but would result in a high ballast of inert gas. The following are typical (but not critical) specifications for the carbon monoxide and chlorine starting materials:

| | Carbon monoxide | Chlorine |
| --- | --- | --- |
| Content | 97.0% min | 97.0% min |
| Hydrogen | 1.5% max | 0.5% max |
| Oxygen | 0.1% max | 0.3% max |
| Sulfur compounds | 0.1% max | — |
| Nitrogen | 1.0% max | 2.0% max |

(Percentages are volume percent.)

In the process of the present invention, the carbon monoxide is generally used in a slight molar excess, based on the chlorine. For example, a molar ratio of carbon monoxide to chlorine within the range of 1.03:1 to 1.1:1. The gases are introduced into the mixing chamber 3 via a gas meter (not shown) and transferred from the mixing chamber into the first reactor 4. The pressure of the gas mixture is at this stage generally 1 to 5 bar, and the temperature at the entrance to the first reactor 4 is generally from 20° to 120° C., preferably from 80° to 100° C. The flow through the reactor is preferably chosen to provide a heat exchanger surface in the first reactor of about 50 to 150 m², preferably 80 to 120 m², and a quantity of active charcoal of 250 to 750 liters (preferably 400 to 600 liters) to produce 1000 kg of phosgene per hour. However, these ranges are not critical. Quantities above or below these limits may often be used without significantly impairing the reaction. The speed of evaporation of the heat carrier may be used to compensate for deviations from the preferred parameters.

The reaction gases in which at least 95% and generally 95 to 98% of the chlorine put into the process is present in the phosgene leave the first reactor at a temperature only slightly (about 5° to 30° C.) above the boiling point of the cooling agent or above the outflow temperature of the non-boiling cooling agent. The reaction gases pass through cooler 5, where they are cooled to a temperature of 50° to 120° C. (preferably 70° to 110° C.) before entering the second reactor 6. The reaction is completed in the second reactor at a temperature of from 50° to 100° C. (preferably from 70° to 100° C.) and the reaction mixture reaches the dissociation equilibrium for this temperature range so long as the temperature does not fall below 50° C. The gaseous mixture leaving the second reactor contains a residual quantity of chlorine of less than 50 ppm (volume), the exact amount depending upon the pressure and temperature in the second reactor. This gaseous mixture may be used for further reactions either immediately or after removal of residues of inert gases and any carbon monoxide still present.

While the process of the invention is being carried out, the heat of reaction produced in the first reactor is removed by means of a heat carrier boiling at 150° to 320° C. (preferably 200°–300° C.) under the given pressure conditions, or a heat carrier which is maintained within this temperature range by forced circulation and temperature control at the reactor outlet. Liquid heat exchangers are introduced into heat exchanger 10 directly while the vapors of the heat carrier are introduced into the heat exchanger 10 through a liquid separator 9. In this heat exchanger 10, condensation and/or cooling of the heat carrier (generally to a temperature up to 50° C. below the outlet temperature of the heat carrier from the first reactor 4) is accompanied by the generation of steam at pressures from 5 to 50 bar, preferably from 20 to 25 bar. The heat carrier leaving the heat exchanger 10 is recycled to the first reactor 4 via circulation line 8. The steam produced is supplied to the steam consumer via steam discharge 11. At the same time, a quantity of water corresponding to the quantity of steam removed and optionally preheated to a temperature of up to 160° C. in heat exchanger 14, possibly under pressure, is fed into heat exchanger 10 through the pipe 12.

The process of this invention enables phosgene to be produced on a large technical scale from chlorine and carbon monoxide with optimum utilization of the thermal energy released in this reaction for the first time. Another advantage of the process of the present invention lies in the fact that the high reaction temperature employed in the first reactor has a positive influence on the length of life of the activated charcoal used. Under the conditions of high temperature synthesis employed, the by-products formed in the starting mixture by chlorination of traces of hydrocarbons are no longer absorbed by the catalyst under the conditions of the present invention. Consequently, the life of the activated charcoal is significantly longer than in prior art processes.

The example which follows serves to illustrate the process according to the invention in more detail without limiting it. All percentages given are percentages by volume.

EXAMPLE

The apparatus employed in this example was that depicted in the Figure. The first reactor 4 was a heat exchanger in the form of a nest of tubes or chrome nickel steel of Type 1.4571 (DIN 17 007) made up of 415 parallel tubes 1.5 m in length and 32/25 mm in diameter. The tubes of the reactor were filled with activated charcoal according to Example 1 of DE-AS No. 2,322,706 and closed at both ends by suitable refined steel mesh. Before the process was carried out, dry nitrogen at 150° C. was blown through the filled reactor until no residual moisture could be detected. A gas mixture consisting of 100 Nm³/h of chlorine (composition: 97.5% chlorine, 0.2% hydrogen, 0.9% carbon dioxide, 1.1% nitrogen, 0.3% oxygen) and 105 Nm³/h of carbon monoxide (composition: 98.5% CO, 1.1% hydrogen, 0.2% carbon dioxide, 0.2% other impurities) preheated to about 80°–100° C. was fed into this reactor from below. The reaction of formation of phosgene started as soon as the gas mixture came into contact with the activated charcoal. The heat of reaction produced was removed by evaporation cooling using boiling dibenzyl benzene (boiling point about 280° C.) at normal pressure.

The vapors of this heat carrier were condensed in heat exchanger 10 after passing through a liquid separator 9. The heat liberated in the heat exchanger generated 0.18 t/h of steam at a pressure of 32 bar from desalted boiler feed water which had been preheated to 150° C. under pressure.

The reaction gas leaving the first reactor at a temperature of about 280°–300° C. and containing about 97–98% of the original chlorine in the form of phosgene was cooled to about 105° C. in a gilled tube heat exchanger 5 and transferred to the second reactor 6 which was a conventional nest of tubes filled with active charcoal.

The second reactor was operated under thermostatic control to maintain a temperature of 70° to 100° C. to ensure the establishment of the phosgene equilibrium. The phosgene leaving the second reactor via phosgene discharge point 7 contained chlorine at a concentration of less than 50 ppm and was suitable for use in further reactions, either directly or after removal of the excess carbon monoxide and residual inert gases.

The aforesaid preheating of the boiler feed water was carried out in heat exchanger 14 using the heat obtained in the cooler 5.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of phosgene having a residual chlorine content of less than 50 ppm comprising (a) reacting chlorine with an excess of carbon monoxide at a temperature above 250° C. in a first tubular reactor in which the tubes have an internal diameter no greater than 50 mm and are made of a material selected from nickel, high alloyed chromium/nickel steel and chromium/nickel/molybdenum steel which reactor contains granular activated charcoal having a grain size of about 3 to 10 mm, a compression resistance of more than 18 kilopond and a benzene absorption capacity above 40 wt. % to form phosgene until 95 to 98% of the chlorine is reacted, (b) removing heat generated in the reactor used in (a) by means of a heat carrier which is removed from the reactor, (c) condensing and/or cooling the heat carrier while generating steam, (d) removing the phosgene-containing gas from the first tubular reactor, (e) cooling the gas of (d) to a temperature of from 50° to 120° C., (f) transferring the cooled gas of (e) to a second reactor containing granular activated charcoal which second reactor is maintained at a temperature of from 50° to 100° C. and (g) completing the phosgene-forming reaction until the phosgene has a residual chlorine content of less than 50 ppm (volume).

2. The process of claim 1 in which the heat generated in (a) is removed by evaporation cooling of a liquid which boils at 150° to 320° C.

3. The process of claim 1 in which the heat generated in (a) is removed by a non-boiling liquid at a temperature of 150° to 320° C. upon leaving the first tubular reactor.

4. The process of claim 1 in which the heat carrier is condensed in a heat exchanger containing water as a cooling medium to generate steam in step (c).

5. The process of claim 4 in which the heat carrier is cooled to a temperature which is up to 50° C. less than the temperature of the heat carrier when removed from the first tubular reactor.

6. The process of claim 1 in which the heat carrier is cooled to a temperature which is up to 50° C. less than the temperature of the heat carrier when removed from the first tubular reactor in step (c).

7. The process of claim 1 in which heat removed in step (b) is also used to preheat water to be converted to steam.

8. The process of claim 1 in which the heat carrier is returned to the first tubular reactor after step (c).

* * * * *